(12) United States Patent
Suzuki et al.

(10) Patent No.: US 8,062,778 B2
(45) Date of Patent: Nov. 22, 2011

(54) MAGNETIC RECORDING DISK AND METHOD FOR MANUFACTURE THEREOF

(75) Inventors: Kota Suzuki, Shinjuku-ku (JP); Koichi Shimokawa, Shinjuku-ku (JP)

(73) Assignee: WD Meida (Singapore) Pte. Ltd., Singapore (SG)

(*) Notice: Subject to any disclaimer, the term of this patent is extended or adjusted under 35 U.S.C. 154(b) by 706 days.

(21) Appl. No.: 12/088,831

(22) PCT Filed: Sep. 28, 2006

(86) PCT No.: PCT/JP2006/319371
§ 371 (c)(1),
(2), (4) Date: Mar. 31, 2008

(87) PCT Pub. No.: WO2007/040152
PCT Pub. Date: Apr. 12, 2007

(65) Prior Publication Data
US 2009/0155517 A1  Jun. 18, 2009

(30) Foreign Application Priority Data

Sep. 30, 2005 (JP) .................. 2005-287357

(51) Int. Cl.
*G11B 5/65* (2006.01)
(52) U.S. Cl. ..................... 428/835.8; 508/582
(58) Field of Classification Search .......... None
See application file for complete search history.

(56) References Cited

U.S. PATENT DOCUMENTS

| | | |
|---|---|---|
| 2004/0213951 A1 | 10/2004 | Shimokawa et al. |
| 2005/0217353 A1 | 10/2005 | Ishiyama |
| 2005/0221403 A1 | 10/2005 | Gazenko |

FOREIGN PATENT DOCUMENTS

| | | | |
|---|---|---|---|
| JP | 2001-164279 A | | 6/2001 |
| JP | 2001164279 A | * | 6/2001 |
| JP | 2004-319058 A | | 11/2004 |
| JP | 2005-221403 A | | 8/2005 |
| JP | 2005221403 A | * | 8/2005 |
| WO | 2005/068589 A1 | | 7/2005 |

* cited by examiner

*Primary Examiner* — Mark Ruthkosky
*Assistant Examiner* — Gary Harris

(57) ABSTRACT

In order to obtain a magnetic recording disk that exhibits high reliability even if the flying height of a magnetic head becomes very narrow, a lubricant is specified in terms of both molecular structure and quantitative data. That is, a lubricating layer 14 of the magnetic recording disk 1 is formed by a lubricant which contains perfluoropolyether compounds represented by the following chemical formula (Chemical Formula 1) and which has a first component content of 71.7%, a second component content of 15.7%, a third component content of 11.7%, a fourth component content of 0.3%, and a fifth component content of 0.6%:

$$X-OCH_2CF_2-(CF_2O)_m(C_2F_4O)_n-CF_2OCH_2O-X \quad \text{(Chemical Formula 1)}$$

m, n=9 to 11 first component: $X=X_1=CH_2CH(OH)CH_2OH$ second component: $X=X_2=CH_2CH(OH)CH_2OCH_2CH(OH)CH_2OH$ third component: $X=X_3=H$ fourth component: $X=X_4=CF_3$ fifth component: $X=X_5=CF_2Cl$.

7 Claims, 3 Drawing Sheets

MAGNETIC RECORDING DISK AND METHOD FOR MANUFACTURE THEREOF

TECHNICAL FIELD

The present invention relates to a magnetic recording disk and a method for manufacturing the magnetic recording disk. The present invention particularly relates to a material technology for lubricating layers.

BACKGROUND ART

Magnetic recording disks each include a nonmagnetic substrate on which at least a magnetic recording layer, a protective layer, and a lubricating layer, are arranged in that order. The lubricating layer has a function of reducing the impact of the magnetic recording disk against a magnetic head. The distance between the magnetic recording disk and the magnetic head becomes narrower and narrower with an increase of a recording capacity of a magnetic recording disk drive such as a HDD. Since a LUL (load/unload) system has been employed, the flying height of the magnetic head is reduced. The magnetic head needs to stably operate at an ultra-low flying height of 10 nm or less.

Under such conditions, the magnetic head may often instantaneously contact the magnetic recording disk rotating at high speed and therefore contact portions thereof are heated to high temperature (flash temperature) due to friction. Therefore, the lubricating layer needs to have high heat resistance so as not to be decomposed or vaporized due to heat under such high-temperature conditions.

The rotation of the magnetic recording disk at high speed causes the lubricating layer to migrate; hence, the thickness of the lubricating layer is likely to become nonuniform. In such a state, there is a problem in that fly stiction occurs when the magnetic head approaches from outside during an LUL operation. Fly stiction is a problem that the flying behavior and height of the magnetic head are changed during flight, causing irregular fluctuations in reproduction output. The magnetic head contacts the magnetic disk during flight in some cases. This can cause head crush. Therefore, the lubricating layer needs to be prevented from migrating.

In order to cope with such a need, a lubricant, such as FOMBLINE Z available from Solvay Solexis Inc., having high heat resistance and long-term stability is usually used to form lubricating layers for magnetic recording disks. The lubricant is purified such that impurities are removed from the composition or the molecular weight thereof is adjusted to an appropriate value. Weight-average molecular weight (Mw) or number-average molecular weight (Mn) has been usually used as a parameter for purification (see Patent Document 1).

[Patent Document 1] Japanese Unexamined Patent Application Publication (JP-A) No. 2004-319058

DISCLOSURE OF INVENTION

Problems to be Solved by the Invention

There is, however, a problem in that weight-average molecular weight or number-average molecular weight is not effective in precisely evaluating properties of lubricants, particularly whether the migration of the lubricants that causes fly stiction occurs, because weight-average molecular weight or number-average molecular weight does not specify the composition of each lubricant. Therefore, it is preferable that the lubricant be specified in terms of both molecular structure and quantitative data. However, if a lubricating layer is analyzed by a conventional technique, for example, nuclear magnetic resonance spectroscopy, there is a problem in that a peak originating from a methylene group (—$CH_2$—) overlaps with a peak originating from a hydroxyl group (—OH) as shown in FIG. 3 and therefore the lubricant cannot be specified in terms of both molecular structure and quantitative data.

In view of the foregoing circumstances, it is an object of the present invention to provide a magnetic recording disk that exhibits high reliability even if the flying height of a magnetic head is reduced because a lubricant used to manufacture the magnetic recording disk is specified in terms of both molecular structure and quantitative data. It is an object of the present invention to provide a method for manufacturing the magnetic recording disk.

Means for Solving the Problems

In order to solve the above problems, the inventors have devised a technique suitable for analyzing a lubricant by nuclear magnetic resonance spectroscopy and have evaluated various lubricants containing perfluoropolyether compounds which contain different terminal groups and which have different compositions. This has resulted in the development of a lubricant capable of solving the problems.

According to this invention, there is provided a magnetic recording disk comprising a nonmagnetic substrate on which at least a magnetic layer, a protective layer, and a lubricating layer are arranged in that order, wherein the lubricating layer is made from a lubricant; the lubricant contains principal components which are perfluoropolyether compounds represented by the following chemical formula (Chemical Formula 1) and which are a first component having terminal groups X represented by X1, a second component having terminal groups X represented by X2, and a third component having terminal groups X represented by X3; and the ratio of the content of the first component to that of the second component to that of the third component in the perfluoropolyether compounds ranges from (71 to 73):(15 to 17):(11 to 13) on a molar basis in the case where the lubricant is analyzed by nuclear magnetic resonance spectroscopy:

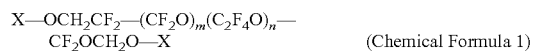

$$X—OCH_2CF_2—(CF_2O)_m(C_2F_4O)_n—CF_2OCH_2O—X \quad \text{(Chemical Formula 1)}$$

m, n=9 to 11
first component: X=$X_1$=$CH_2CH(OH)CH_2OH$
second component: X=$X_2$=$CH_2CH(OH)CH_2OCH_2CH(OH)CH_2OH$
third component: X=$X_3$=H In this invention, it is preferable that the sum of the content of the first component, that of the second component, and that of the third component in the perfluoropolyether compounds is 99.0% or more on a molar basis in the case where the lubricant is analyzed by nuclear magnetic resonance spectroscopy.

According to this invention, there is provided a magnetic recording disk comprising a nonmagnetic substrate on which a magnetic layer, a protective layer, and a lubricating layer are arranged in that order, wherein the lubricating layer is made from a lubricant; the lubricant contains principal components which are perfluoropolyether compounds represented by the above-mentioned chemical formula (Chemical Formula 1) and which are a first component having terminal groups X represented by X1, a second component having terminal groups X represented by X2, and a third component having terminal groups X represented by X3; and the sum of the content of the first component, that of the second component, and that of the third component in the perfluoropolyether compounds is 99.0% or more on a molar basis in the case where the lubricant is analyzed by nuclear magnetic resonance spectroscopy:

According to the present invention, the perfluoropolyether compound preferably further contains a fourth component having terminal groups represented by X4 and a fifth component having terminal groups represented by X5 in the following chemical formula (Chemical Formula 2) and the sum of the content of the fourth component and that of the fifth component in the perfluoropolyether compound is preferably 1.0% or less on a molar basis in the case where the perfluoropolyether compound is analyzed by nuclear magnetic resonance spectroscopy.

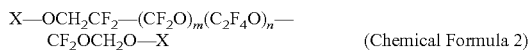

(Chemical Formula 2)

m, n=9 to 11 first component: $X=X_1=CH_2CH(OH)CH_2OH$ second component: $X=X_2=CH_2CH(OH)CH_2OCH_2CH(OH)CH_2OH$ third component: $X=X_3=H$ fourth component: $X=X_4=CF_3$ fifth component: $X=X_5=CF_2Cl$ According to the present invention, when the lubricant further contains a fourth component having terminal groups represented by X4 and a fifth component having terminal groups represented by X5 in the above-mentioned chemical formula (Chemical Formula 2), the content of the fourth component is preferably less than that of the fifth component in the case where the lubricant is analyzed by nuclear magnetic resonance spectroscopy.

According to the present invention, the protective layer is made of a carbonaceous material.

In a method for manufacturing a magnetic recording disk according to the present invention, the lubricating layer is formed from the lubricant obtained by molecularly distilling a raw material for lubricants.

Advantages

According to the present invention, terminal groups of perfluoropolyether compounds contained in a lubricant are specified in terms of structure and quantitative data; hence, properties of the lubricant can be clearly specified. According to the present invention, a lubricant which has high heat resistance and in which migration causing fly stiction hardly occurs can be specified. Accordingly, the present invention can provide a magnetic recording disk that exhibits high reliability even if the flying height of a magnetic head is reduced.

REFERENCE NUMERALS

1 magnetic recording disk
11 nonmagnetic substrate
12 magnetic layer
13 protective layer
14 lubricating layer

BEST MODES FOR CARRYING OUT THE INVENTION

Embodiments of the present invention will now be described with reference to the accompanying drawings.

(Configuration of Magnetic Recording Disk)

Figure 1:
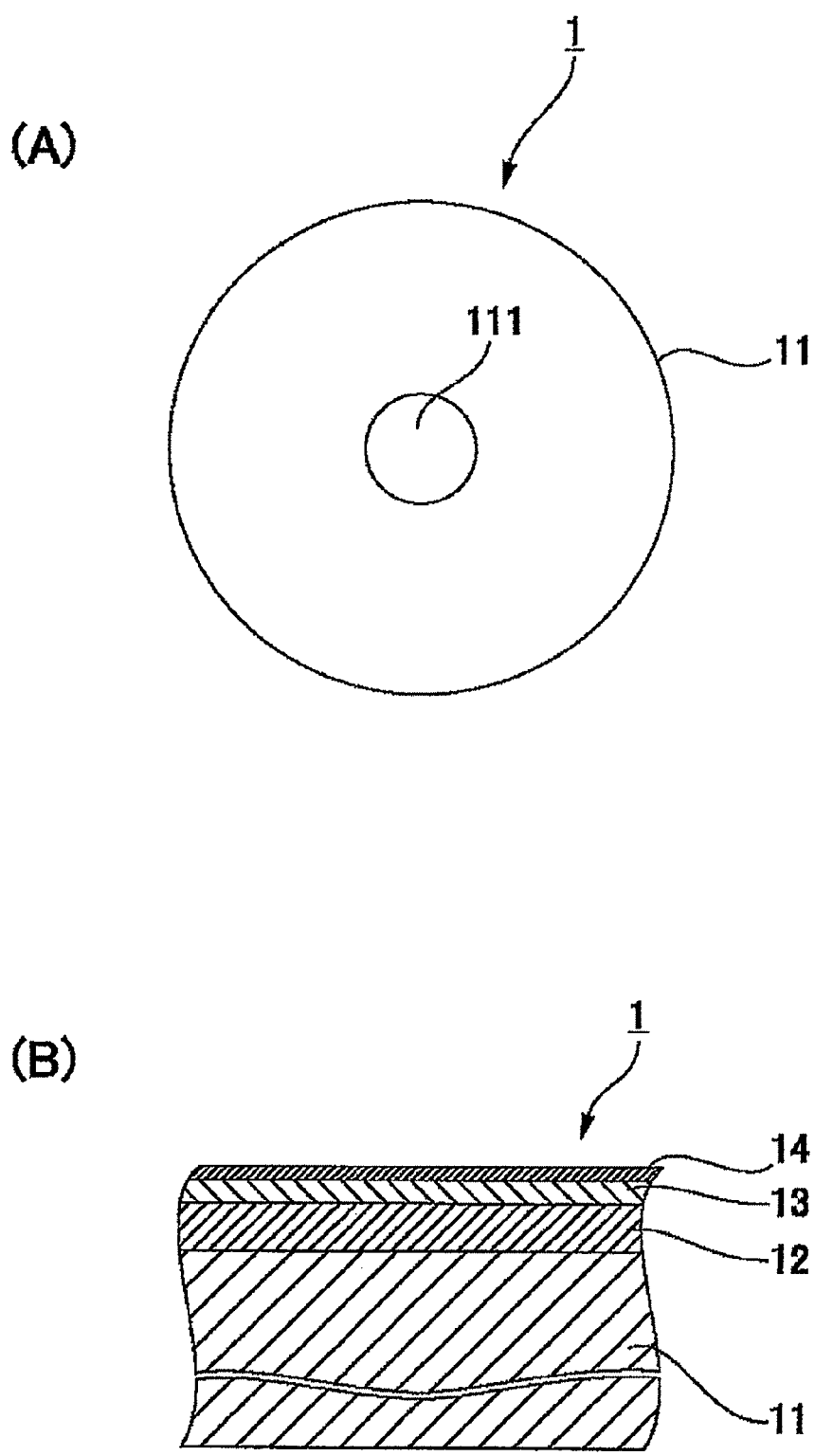
FIG. 1 shows a plan view of a magnetic recording disk and a schematic sectional view of the magnetic recording disk in (A) and (B), respectively.

FIG. 1(A) is a plan view of a magnetic recording disk according to an embodiment of the present invention and FIG. 1(B) is a schematic sectional view of the magnetic recording disk. With reference to these figures, the magnetic recording disk 1 includes a circular nonmagnetic substrate 11 having a center hole 111, a base layer (not shown), a magnetic layer 12 formed by a DC magnetron sputtering process, a protective layer 13 formed by a plasma-enhanced CVD process, and a lubricating layer 14 formed by a dipping process, these layers being arranged on the nonmagnetic substrate 11 in that order. The nonmagnetic substrate 11 is made of, for example, chemically reinforced glass such as aluminosilicate glass. The protective layer 13 is, for example, 5 nm thick, is made of hydrogenated carbon (diamond-like carbon), and has high wear resistance and a function of protecting the magnetic layer 12. The lubricating layer 14 is, for example, 1.2 nm thick, is made of a polymeric material, and has a function of reducing the impact of the magnetic recording disk against a magnetic head. In order to form the lubricating layer 14 by the dipping process, the substrate, having the protective layer 13, for forming the magnetic recording disk is dipped into a chemical solution prepared by dissolving a predetermined lubricant in an organic solvent, removed from the chemical solution, and then heat-treated such that the lubricating layer 14 is fixed.

(Preparation of Lubricating Layer)

Figure 2:
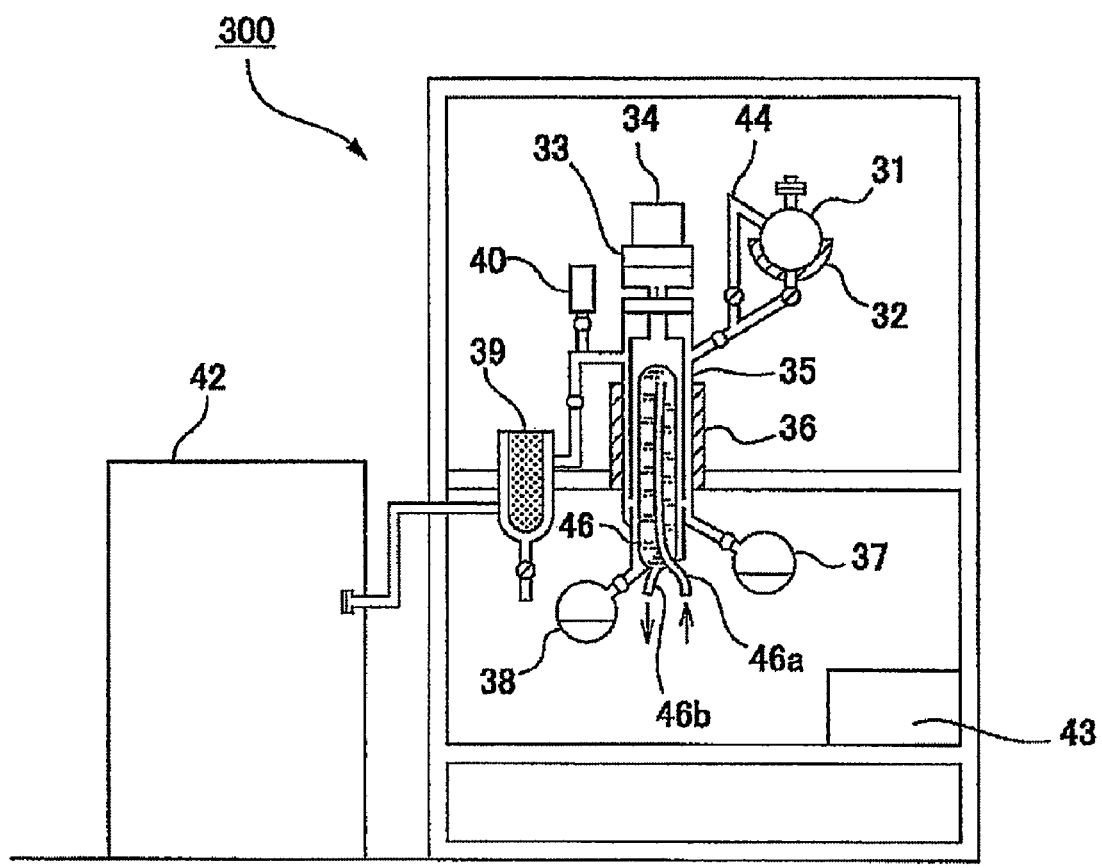
FIG. 2 is a schematic view of a molecular distillation unit.

FIG. 2 is a schematic view of a molecular distillation unit. In this embodiment, the following lubricant is prepared and then used to form the lubricating layer 14 of the magnetic recording disk 1: a lubricant containing a plurality of perfluoropolyether compounds having different terminal groups at a predetermined ratio. The magnetic recording disk, which includes the lubricating layer 14 made from the lubricant, is subjected to various tests. In this embodiment, a raw material such as the lubricant FOMBLINE Z (trade name) available from Solvay Solexis Inc. is used to prepare the lubricant. The raw material purified is used as the lubricant. Examples of a purification process used include supercritical extraction processes, gel permeation chromatography (GPC), and molecular distillation processes. In this embodiment, the distillation unit shown in FIG. 2 is used to molecularly distill the raw material, whereby various lubricants are prepared.

Principal components contained in the raw material are perfluoropolyether compounds represented by the following chemical formula (Chemical Formula 3) according to the analysis by nuclear magnetic resonance spectroscopy. The perfluoropolyether compounds are a first component (mono-adduct) having terminal groups X represented by X1, a second component (bis-adduct) having terminal groups X represented by X2, a third component having terminal groups X represented by X3, a fourth component having terminal groups X represented by X4, and a fifth component having terminal groups X represented by X5. The raw material has the following contents:

a first component content of 71.9%,
a second component content of 10.5%,
a third component content of 15.0%,
a fourth component content of 1.4%, and
a fifth component content of 1.2%.

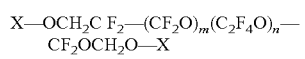

[Chemical Formula 3]

m, n=9 to 11 first component: $X=X_1=CH_2CH(OH)CH_2OH$ second component: $X=X_2=CH_2CH(OH)CH_2OCH_2CH(OH)CH_2OH$ third component: $X=X_3=H$ fourth component: $X=X_4=CF_3$ fifth component: $X=X_5=CF_2Cl$ The raw material has the following properties:
a number-average molecular weight (Mn) of 2326.50,
an average molecular weight per —OH group of 627.06,
an average —OH group number per molecule of 3.71, and
a main chain $(C_2F_4O)$-to-$(CF_2O)$ ratio of 0.89.

In order to purify the raw material with the distillation unit 300 shown in FIG. 2, the raw material is charged into a feed flask 31. Molecular distillation need not be necessarily performed under vacuum and is preferably performed under predetermined vacuum conditions when the raw material contains a polymer component. This is because if the raw material is not molecularly distilled under vacuum, the frequency of collisions between vaporized molecules and other molecules is high and therefore the vaporized molecules that are within the mean free path are prevented from being condensed. Therefore, after the raw material is charged into the feed flask 31, the distillation unit is evacuated to a predetermined vacuum degree with an evacuation unit 42. The vacuum degree therein is, for example, about $1 \times 10^{-2}$ to $1 \times 10^{-3}$ Pa and is preferably less than this pressure range. The vacuum degree can be measured with a vacuum gauge 40. The raw material in the feed flask 31 can be degassed with the help of the negative pressure in the distillation unit in advance such that gaseous impurities and the like are removed from the raw material. The gaseous impurities, which are contained in the raw material, flow toward the evacuation unit 42 through a pipe 44 and are partially trapped in a low-boiling point substance condensation trap 39. The raw material in the feed flask 31 may be heated with a feed flask mantle heater 32 as required.

After the distillation unit is evacuated to a predetermined vacuum degree, the raw material is fed from the feed flask 31 to a distillation column 35. The rate (feed rate) of the unpurified lubricant fed from the feed flask 31 to the distillation column 35 can be controlled by adjusting the opening of a cock 35 disposed under the feed flask 31. In usual, the feed rate thereof is preferably about 1 to 30 g/min. When the feed rate is small, it takes a long time to distillate the raw material. When the feed rate is large, the distillation efficiency can be low.

The raw material in the distillation column 35 is heated to a predetermined temperature with a tubular distillation column mantle heater 36 surrounding the distillation column 35. In this embodiment, the heating temperature thereof is equal to a temperature at which the raw material is vaporized. The heating temperature of the raw material can be controlled by adjusting the temperature of the distillation column mantle heater 36. The heating temperature of the raw material in the distillation column 35 can be measured with a thermometer placed in the distillation column 35.

The distillation column 35 contains a magnetic coupling agitator 33 which extends in the longitudinal direction of the distillation column 35 and which includes a wiper made of a fluororesin. The wiper is controlled with an agitator control box 34 so as to rotate at a speed of about 20 to 100 rpm in a constant direction. The rotation of the wiper allows the raw material to form a thin film on the inner wall of the distillation column 35, thereby promoting the vaporization of the raw material. The vapor of the raw material contacts a cooling rod 46 placed in the distillation column 35 and therefore is liquefied. The distillate is collected in a distillate-receiving flask 38. Cooling water is introduced into an inlet port 46a located at the lower end of the cooling rod 46 and then removed through an outlet port 46b. The residue, which is not vaporizable, collected in a residue-receiving flask 37 may be repeatedly distillated in such a manner that the heating temperature is changed with the distillation column mantle heater 36 and the residue is then fed into the feed flask 31. The above procedure is controlled with an operation board 43.

A lubricant was obtained using the molecular distillation unit 300 as described below. The raw material was charged into the feed flask 31 of the distillation unit 300 and the pressure in the molecular distillation unit 300 was reduced to $1 \times 10^{-3}$ Pa with the evacuation unit 42. The raw material in the feed flask 31 was sufficiently degassed with the help of the negative pressure in the molecular distillation unit in advance such that gaseous impurities and the like were removed from the raw material. The raw material was fed to the distillation column 35 from the feed flask 31 at a constant feed rate. In this operation, the wiper in the distillation column 35 was operated at a predetermined rotational speed. The temperature of the distillation column 35 was 180° C. and was equal to the set temperature of the mantle heater 36. A 180° C. distillate was collected in the distillate-receiving flask 38 and then used as the lubricant. The purification of the lubricant was performed in a clean room. The atmosphere in the clean room had cleanliness better than Class 6 specified in Japanese Industrial Standard (JIS) B9920.

In order to form the lubricating layer 14 from the lubricant, the substrate, having the protective layer 13, for forming the magnetic recording disk is dipped into a chemical solution prepared by dispersing the lubricant in the fluorine-containing solvent Vertrel XF (trade name) available from Mitsui Dupont Fluorochemical Co. The resulting substrate is heat-treated such that the lubricant is fixed to the substrate, whereby the lubricating layer 14 is formed.

(Analysis by Nuclear Magnetic Resonance Spectroscopy)

Nuclear magnetic resonance spectroscopy is as follows: the spin state of a nucleus is split into two levels by applying a magnetic field to matter and therefore analysis is performed by the irradiation of a radio wave corresponding to the difference in energy between the spin levels. Since the difference in energy between the spin levels reflects an electronic environment (chemical environment) in which the nucleus is placed, obtained peaks can be assigned to atoms in a molecule; hence, the amount of each atom in the molecule can be determined. Therefore, the structure of the molecule can be investigated in detail.

Figure 3:
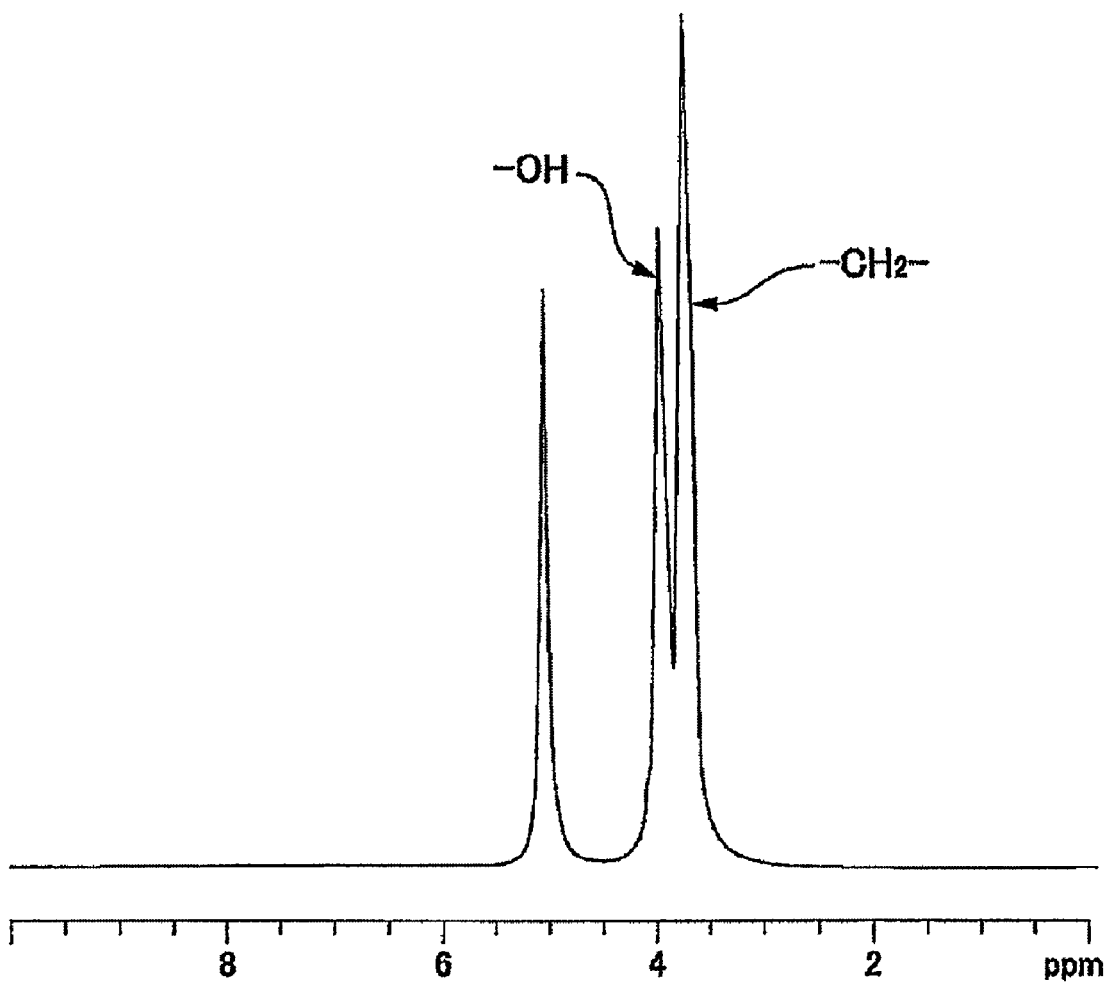
FIG. 3 is a graph showing the results obtained by analyzing a sample by nuclear magnetic resonance spectroscopy in such a manner that $^1H$ is measured.

In principle, all nuclides that have nuclear spins can be measured by nuclear magnetic resonance spectroscopy. Examples of such nuclides include $^1H$, $^{13}C$, $^{19}F$, and $^{31}P$. If 1H is measured, the peak originating from the methylene group (—$CH_2$—) overlaps with the peak originating from the hydroxyl group (—OH) as described above with reference to FIG. 3; hence, it is difficult to specify the lubricant in terms of both molecular structure and quantitative data. In this embodiment, two techniques below are used to analyze the lubricant by nuclear magnetic resonance spectroscopy.

A first technique is one for measuring $^{19}F$. If the raw material is analyzed by this technique, signals with chemical shifts can be obtained from components as described below.

| Chemical shifts (relative values, ppm) | Corresponding components |
| --- | --- |
| −52.1 | Peak assigned to main chain |
| −53.7 | Peak assigned to main chain |
| −55.4 | Peak assigned to main chain |
| −89.1 | Peak assigned to main chain |
| −90.7 | Peak assigned to main chain |
| −125.8 | Peak assigned to main chain |
| −129.7 | Peak assigned to main chain |

-continued

| Chemical shifts (relative values, ppm) | Corresponding components |
|---|---|
| −81.3 | Peak assigned to terminal group of third component |
| −83.3 | Peak assigned to terminal group of third component |
| −56.3 | Peak assigned to terminal group of fourth component |
| −58.0 | Peak assigned to terminal group of fourth component |
| −27.7 | Peak assigned to terminal group of fifth component |
| −29.3 | Peak assigned to terminal group of fifth component |
| −74.5 | Peak assigned to terminal group of fifth component |
| −78.0 | Integration of peaks assigned to terminal groups of first and second components |
| −80.0 | Integration of peaks assigned to terminal groups of first and second components |

Since the peak area ratio of each signal corresponds to the abundance of fluorine in each component, the structure of each terminal group can be determined and the molecular weight of the component can be determined from the ratio of the main chain to the terminal group.

A second technique is one for measuring $^1$H. According to the second technique, after the raw material is pre-treated with a reagent such that a functional group is attached to the raw material and thereby the structure of the terminal group is modified, the resulting raw material is analyzed. As a result, signals below can be obtained.

| Chemical shifts (relative values, ppm) | Corresponding components |
|---|---|
| 5.5 | Peak assigned to first component |
| 5.3 | Peak assigned to second component |

Therefore, the ratio of the first component to the second component can be determined.

(Configuration of Lubricating Layer)

In comparisons between the analysis results obtained by these techniques and the test results of the magnetic recording disk 1 prepared using the lubricant, the optimum composition of the lubricant is described from the analysis results obtained by nuclear magnetic resonance spectroscopy as described below. The perfluoropolyether compounds represented by the above-mentioned chemical formula (Chemical Formula 3) are the first component (mono-adduct) having terminal groups X represented by X1, the second component (bis-adduct) having terminal groups X represented by X2, the third component having terminal groups X represented by X3, the fourth component having terminal groups X represented by X4, and the fifth component having terminal groups X represented by X5. The lubricant has the following contents (the mole percentage of each perfluoropolyether compound):
a first component content of 71.7%,
a second component content of 15.7%,
a third component content of 11.7%,
a fourth component content of 0.3%, and
a fifth component content of 0.6%.

The lubricant has the following properties:
a number-average molecular weight (Mn) of 2630.12,
an average molecular weight per —OH group of 656.31,
an average —OH group number per molecule of 4.01, and
a main chain ($C_2F_4O$)-to-($CF_2O$) ratio of 0.91.

From a viewpoint that the magnetic recording head 1 has sufficient reliability even if the flying height of a magnetic head is set to 10 nm or less, the content of each component is specified as described below. The ratio of the content of the first component to that of the second component to that of the third component in the perfluoropolyether compounds preferably ranges from (71 to 73):(15 to 17):(11 to 13) on a molar basis in the case where the lubricant is analyzed by nuclear magnetic resonance spectroscopy. An alcohol-modified perfluoropolyether compound that is one of the perfluoropolyether compounds includes compounds, such as diols, triols, and tetraols, having various terminal groups. Lubricating properties of molecules of the lubricant and the adhesion of the lubricant to the protective layer 13 vary depending on the degree of alcohol modification, that is, the number of hydroxyl groups bonded to terminal groups of the perfluoropolyether main chain. Lubricating properties of the lubricant molecules and the adhesion of the lubricant to the protective layer 13 can be precisely specified if the percentage of various alcohol-modified compounds, such as diols, triols, and tetraols is specified.

From a viewpoint that the magnetic recording head 1 has sufficient reliability even if the flying height of a magnetic head is set to 10 nm or less, the sum of the content of the first component, that of the second component, and that of the third component is specified as described below. The sum thereof is preferably 99.0% or more on a molar basis in the case where the lubricant is analyzed by nuclear magnetic resonance spectroscopy. That is, the sum of the content of the fourth component and that of the fifth component is preferably 1.0% or less on a molar basis in the case where the lubricant is analyzed by nuclear magnetic resonance spectroscopy, the fourth and fifth components being contained in the raw material.

Furthermore, the fourth component is preferably less than the fifth component. This is because the fourth and fifth components are impurities in the lubricant and are probably different from each other in their ability to promote the decomposition of the lubricant at high temperature.

OTHER EXAMPLES

The configurations (shape, size, and arrangement) used to describe the above embodiment are merely schematically shown in the figures such that the present invention can be understood and practiced. Numbers and compositions (materials) used to describe the configurations are for exemplification only. The present invention is not limited to an embodiment below and modifications may be made within the scope of the inventive concept disclosed in the appended claims.

The invention claimed is:

1. A magnetic recording disk comprising a nonmagnetic substrate on which at least a magnetic layer, a protective layer, and a lubricating layer are arranged in that order,
wherein the lubricating layer is made from a lubricant; the lubricant contains principal components which are perfluoropolyether compounds represented by the following chemical formula (Chemical Formula 1) and which are a first component having terminal groups X represented by X1, a second component having terminal groups X represented by X2, and a third component having terminal groups X represented by X3; and the ratio of the content of the first component to that of the second component to that of the third component in the perfluoropolyether compounds ranges from (71 to 73):(15 to 17):(11 to 13) on a molar basis in the case where the lubricant is analyzed by nuclear magnetic resonance spectroscopy:

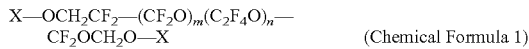 (Chemical Formula 1)

m, n=9 to 11
first component: $X=X_1=CH_2CH(OH)CH_2OH$
second component: $X=X_2=CH_2CH(OH)CH_2OCH_2CH(OH)CH_2OH$
third component: $X=X_3=H$.

2. The magnetic recording disk according to claim 1, wherein the sum of the content of the first component, that of the second component, and that of the third component in the perfluoropolyether compounds is 99.0% or more on a molar basis in the case where the lubricant is analyzed by nuclear magnetic resonance spectroscopy.

3. A magnetic recording disk comprising a nonmagnetic substrate on which at least a magnetic layer, a protective layer, and a lubricating layer are arranged in that order,
wherein the lubricating layer is made from a lubricant; the lubricant contains principal components which are perfluoropolyether compounds represented by the following chemical formula (Chemical Formula 2) and which are a first component having terminal groups X represented by X1, a second component having terminal groups X represented by X2, and a third component having terminal groups X represented by X3; and the sum of the content of the first component, that of the second component, and that of the third component in the perfluoropolyether compounds is 99.0% or more on a molar basis in the case where the lubricant is analyzed by nuclear magnetic resonance spectroscopy:

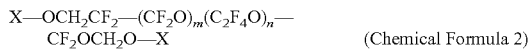 (Chemical Formula 2)

m, n=9 to 11
first component: $X=X_1=CH_2CH(OH)CH_2OH$
second component: $X=X_2=CH_2CH(OH)CH_2OCH_2CH(OH)CH_2OH$
third component: $X=X_3=H$.

4. A magnetic recording disk comprising a nonmagnetic substrate on which at least a magnetic layer, a protective layer, and a lubricating layer are arranged in that order,
wherein the lubricating layer is made from a lubricant; the lubricant contains principal components which are perfluoropolyether compounds represented by the following chemical formula (Chemical Formula 3) and which are a first component having terminal groups X represented by X1, a second component having terminal groups X represented by X2, a third component having terminal groups X represented by X3, a fourth component having terminal groups X represented by X4, and a fifth component having terminal groups X represented by X5; and the sum of the content of the fourth component and that of the fifth component in the perfluoropolyether compounds is 1.0% or less on a molar basis in the case where the lubricant is analyzed by nuclear magnetic resonance spectroscopy:

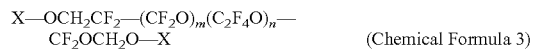 (Chemical Formula 3)

m, n=9 to 11
first component: $X=X_1=CH_2CH(OH)CH_2OH$
second component: $X=X_2=CH_2CH(OH)CH_2OCH_2CH(OH)CH_2OH$
third component: $X=X_3=H$
fourth component: $X=X_4=CF_3$
fifth component: $X=X_5=CF_2Cl$.

5. A magnetic recording disk comprising a nonmagnetic substrate on which at least a magnetic layer, a protective layer, and a lubricating layer are arranged in that order,
wherein the lubricating layer is made from a lubricant; the lubricant contains principal components which are perfluoropolyether compounds represented by the following chemical formula (Chemical Formula 4) and which are a first component having terminal groups X represented by X1, a second component having terminal groups X represented by X2, a third component having terminal groups X represented by X3, a fourth component having terminal groups X represented by X4, and a fifth component having terminal groups X represented by X5; and the content of the fourth component is less than that of the fifth component in the case where the lubricant is analyzed by nuclear magnetic resonance spectroscopy:

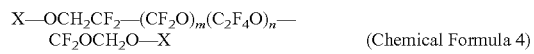 (Chemical Formula 4)

m, n=9 to 11
first component: $X=X_1=CH_2CH(OH)CH_2OH$
second component: $X=X_2=CH_2CH(OH)CH_2OCH_2CH(OH)CH_2OH$
third component: $X=X_3=H$
fourth component: $X=X_4=CF_3$
fifth component: $X=X_5=CF_2Cl$.

6. The magnetic recording disk according to claim 1, wherein the protective layer is made of a carbonaceous material.

7. A method for manufacturing the magnetic recording disk according to any one of claims 1 to 6, comprising a step of forming the lubricating layer from the lubricant obtained by molecularly distilling a raw material for lubricants.

* * * * *